(No Model.)

G. T. PARKER.
HORSE DETACHER.

No. 399,434.   Patented Mar. 12, 1889.

WITNESSES:
Fred G. Dieterich
P. B. Turpin

INVENTOR,
Geo. T. Parker
BY Munn & Co.
ATTORNEY.

UNITED STATES PATENT OFFICE.

GEORGE T. PARKER, OF GLASGOW, KENTUCKY.

HORSE-DETACHER.

SPECIFICATION forming part of Letters Patent No. 399,434, dated March 12, 1889.

Application filed June 28, 1888. Serial No. 278,488. (No model.)

*To all whom it may concern:*

Be it known that I, GEORGE T. PARKER, of Glasgow, in the county of Barren and State of Kentucky, have invented a new and useful Improvement in Horse-Detachers, of which the following is a specification.

My invention is in the nature of an improvement in horse-detachers, providing, in connection with a holdback-hook for use on vehicle-shafts, a dog, and a presser acting on said dog to secure the same in position in such manner that the ring connected with the breeching-strap may be conveniently adjusted into the hook and may be released therefrom when the horse moves forward out of the shafts after the traces have been unfastened.

The invention consists in certain novel constructions and combinations of parts, as will be hereinafter described and claimed.

Figure 1:
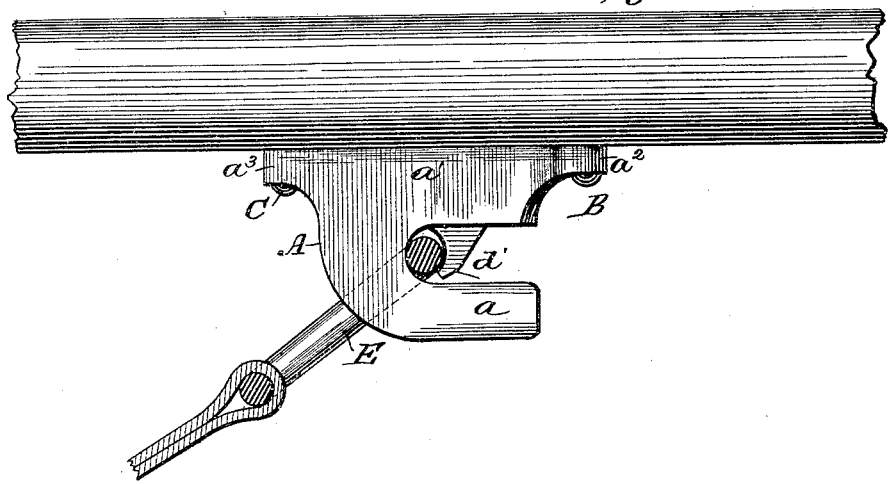
Figure 2:
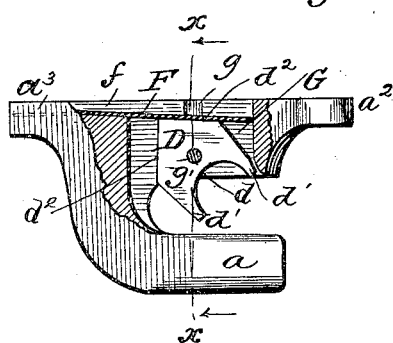
Figure 3:
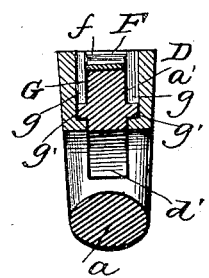

In the drawings, Figure 1 is a side view of my improved detacher in place on a thill. Fig. 2 is a side elevation, part in section, of the detacher; and Fig. 3 is a sectional view on about line $x\,x$, Fig. 2.

The holdback-hook A is secured, in practice, to the shaft, usually to the under side thereof, and is formed with the hook proper, $a$, the body portion $a'$, and the flanges $a^2\,a^3$, the former being perforated for the fastening-screws B and the latter for the fastening-screw C, which also secures the spring-plate constituting the presser. The dog D is pivoted to the hook and has a recess or notch, $d$, fitted to receive the ring E, and is formed in front and rear of said recess with projecting bearings or arms $d'$, against which the ring engages in its movement into and out of the hook.

On its rear or inner side the dog has faces $d^2\,d^3$, engaged by the presser in the opened and closed positions of the hook, the said presser F so serving to secure the dog in its different positions.

In the construction shown the presser is a spring fitted in a recess, $f$, in the inner side of the hook and secured at one end by the screw C. The dog also fits partially in a mortise, G, formed through the body of the holdback, having grooves $g$ in its side wall, receiving studs $g'$, extended laterally from the dog, so that the latter may be pivoted within the holdback without the necessity of separate pivots, thus cheapening construction.

It will be seen from the foregoing that the holdback will secure the ring at the end of the breeching when desired, the spring and dog serving to prevent the ring jolting or jarring out of the hook, and the spring keeping the dog from rattling; but when the traces are released and the horse moves forward out of the shafts the dog will by the forward draft of the breeching-ring thereon be adjusted to release said hook, as will be understood from the foregoing and the accompanying drawings.

It will be understood that in practice one of the improved holdbacks is attached to each shaft.

Having thus described my invention, what I claim as new is—

The improvement in holdbacks, substantially as herein described, consisting of the body having hook $a$ and mortise G, and provided in the side walls of such mortise with grooves $g$, the dog D, provided with the lateral pivot-lugs $g'$ entering the grooves $g$, and the presser engaging dog D, substantially as set forth.

GEORGE T. PARKER.

Witnesses:
C. P. EASTON,
F. J. FISHBACK.